United States Patent [19]
Possati

[11] 3,846,689
[45] Nov. 5, 1974

[54] METHOD AND DEVICE FOR THE CONTROL OF THE MACHINING ON A MACHINE TOOL FOR STOCK REMOVAL

[75] Inventor: Mario Possati, Bologna, Italy

[73] Assignee: Finiki Italiana Marposs-Soc. In Accomandita Semplice di Mario Possati & C, Bologne, Italy

[22] Filed: Apr. 5, 1973

[21] Appl. No.: 348,082

[30] Foreign Application Priority Data
Apr. 10, 1972 Italy.................................. 3392/72
Jan. 18, 1973 Italy.................................. 3304/73

[52] U.S. Cl............................ 318/571, 51/165.91
[51] Int. Cl............................................. B23g 5/28
[58] Field of Search .... 318/571; 51/165.77, 165.91, 51/165.71

[56] References Cited
UNITED STATES PATENTS
3,684,873  8/1972  Meyer et al..................... 318/571 X
3,699,720  10/1972  Lenning........................ 318/571 UX
3,785,091  1/1974  Pozzetti....................... 51/165.91 X Primary Examiner—B. Dobeck
Attorney, Agent, or Firm—Stevens, Davis, Miller & Mosher

[57] ABSTRACT

A method for controlling machining on a machine tool carrying out subsequent cuts for removing stock which includes storing signals representative of the stocks measured after the last and preceding cut, obtaining a difference signal of said signals, comparing the difference signal with a signal representative of the stock still to be removed and controlling the machine tool cycle by means of a signal resulting from the comparison. A device for controlling the machining on a machine tool which includes a first memory unit to sequentially store signals responsive to the values measured by an instrument at every cut, a second memory unit to sequentially store signals responsive to the value measured by the instrument at the preceding cut and a comparison unit to compare a difference signal of the stored signals with a reference signal with the output of the comparison unit being connected to a control unit for the machine cycle.

11 Claims, 4 Drawing Figures

METHOD AND DEVICE FOR THE CONTROL OF THE MACHINING ON A MACHINE TOOL FOR STOCK REMOVAL

This invention relates to a method and a device for the control of the machining on a machine tool carrying out cuts for stock removal, the control being effected by processing the signals of a measuring instrument for the size gauging of the workpiece being machined, in order to obtain pieces with the required sizes.

The instrument measures the stock still to be removed after subsequent cuts of the tool.

It is desirable to stop the machine when the measured sizes correspond exactly to the required ones.

In high production machines however the quantity of stock removed at every cut is considerable, which cut may be very near to the tolerance value of the workpiece.

Therefore, it may happen that, after a cut, the workpiece has a slightly larger size (or smaller, if it is an internal machining) than the nominal one, and that, after the following cut, the size of the workpiece turns out to be rather markedly smaller (or larger) than the nominal value.

The interruption of the machining is conventionally controlled after the last cut, i.e., as soon as the measuring instrument detects that the size of the piece is equal to or smaller than the nominal value.

The disparity in the effective sizes of the machined pieces around the nominal value is therefore rather high and sometimes excessive.

The technical problem the present invention intends to solve is to provide a method and relevant device which reduces the disparity around the nominal value.

According to the method of the present invention, the machining cycle is controlled on the basis of a comparison between the remaining stock to be removed after every cut and the evaluated amount of stock the tool would remove in the next cut. The present invention provides moreover a device for controlling the machining on a machine tool carrying out subsequent cuts for stock removal, a measuring instrument being provided for the size gauging of the pieces being machined, the device comprising, according to the present invention, a first memory means to sequentially store the values measured by said instrument after every cut, at least one further memory means to sequentially store the values previously measured by the instrument, means to process the stored values and to compare the result of the processing with a reference signal, the result of this comparison being used to control the machining cycle.

The following description relates to preferred embodiments of the present invention, given by way of non-limiting example, reference being made to the enclosed drawings in which.

Figure 1:
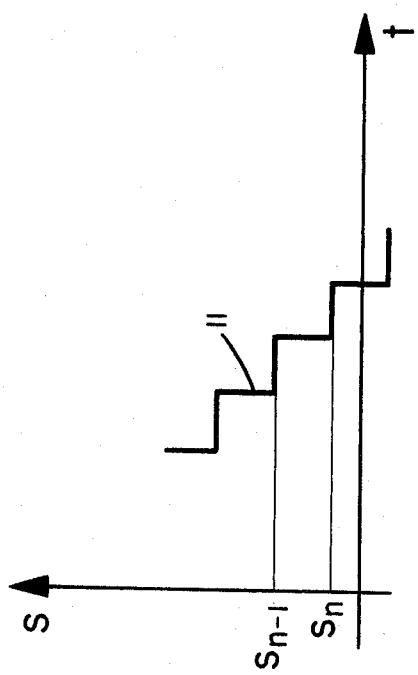
FIG. 1 represents a diagram illustrating the working of a machine tool effecting subsequent cuts for removing stock from the workpiece being machined.

With reference to FIG. 1, curve 11 represents very schematically the machining cycle of a reciprocating or rotary table machine tool, particularly a grinding machine.

The ordinates show the values of signals S representative of the stock, which actually decreases by a certain step at every cut of the tool.

The signals S are provided by a measuring instrument or gauge, per se known and not shown in the drawings.

Conventionally, the gauge stops the machining as soon as the measured stock indicates that the workpiece size is equal or smaller than the nominal value.

As stated above, it may happen that the measured stock is slightly larger than the nominal stock value (which usually is considered equal to zero, since the measures of stock are made with reference to the nominal size of the piece) to be achieved, so that the machine would make another cut and consequently produce a piece rather markedly "undersize."

The embodiments of the method and device, which will be illustrated with reference to FIG. 2, may be used when the quantity of stock removed by subsequent cuts is substantially constant. The embodiments permit reducing the disparity in the size values of the machined pieces, by comparing the depth of the last stock step which has been removed with the amount of stock still to be removed.

In particular, if half of the last step is higher than said stock amount, machining is stopped, as a further cut would cause an error higher than the one already existing.

In short, by naming $S_n$ the value of the signal representative of the stock after the last cut, $S_{n-1}$ the value of the signal representative of the stock after the penultimate cut, and $S_o$ the value of the signal corresponding to the nominal size of the workpiece, the method and relevant device control whether:

$$S_{n-1} - S_n/2 \geq S_n - S_o$$

By putting $S_o = 0$ for the reasons explained above, the preceding inequality can be written in the form:

$$3S_n - S_{n-1} \leq 0$$

As soon as this inequality is verified, machining is stopped. Thus, the maximum theoretic disparity possible corresponds to one half of the cutting depth.

Conversely, the maximum disparity obtainable by conventional methods and devices is equal to the cutting depth.

Figure 2:
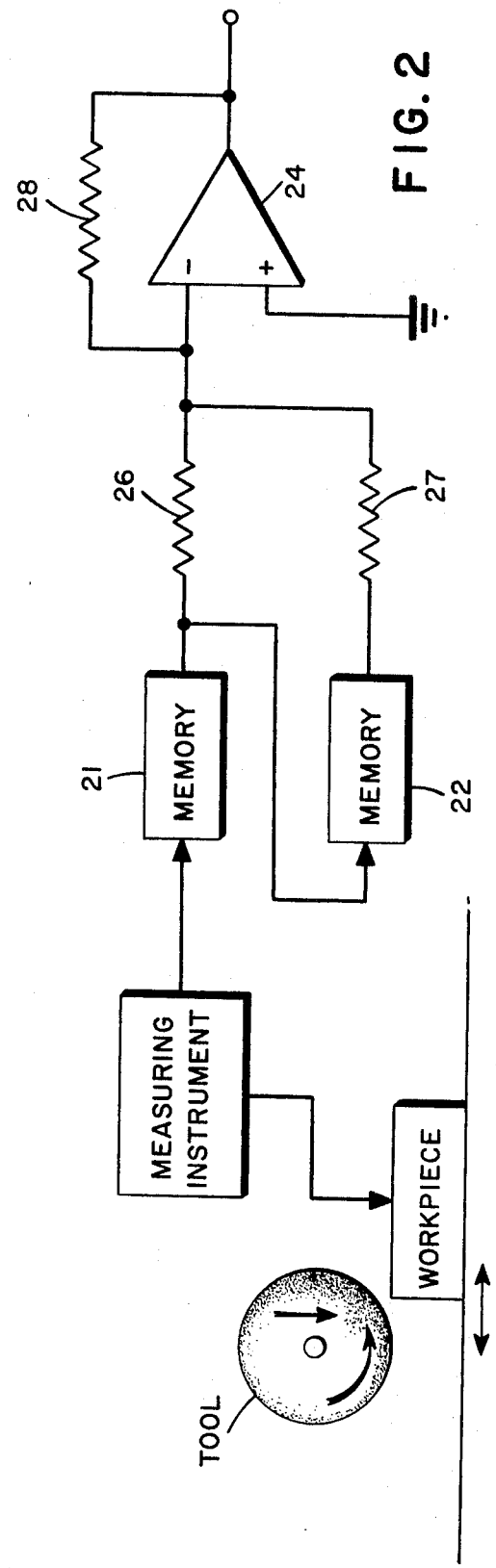
FIG. 2 shows a scheme of a first embodiment of the device according to the present invention.

Therefore the device and method of FIG. 2 allows reduction of the disparity to a half.

The device comprises a main memory 21 and an auxiliary memory 22. The output signal of the measuring instrument (the instrument is not represented in the drawings) is sent to the input of the main memory 21, which stores the subsequent values of the signal S after every cut.

The auxiliary memory 22, whose input is connected with the output of main memory 21, stores the signals representative of the penultimate cutting carried out, i.e., the values succeedingly cancelled from memory 21.

In brief, when the signals $S_n$ related to the $n^{th}$ cutting is introduced into memory 21, the signal $S_{n-1}$ related to the $(n-1)^{th}$ cutting is transmitted to memory 22.

Memory 22 in addition gives at the output a signal of a sign opposite to the one received at the input.

The signals contained in memory 21 and 22 are brought to the negative input of an operational amplifier 24 through two relevant resistors 26, 27.

The resistance value of resistor 26 is equal to one third of the value of resistor 27.

The positive input of amplifier 24 is grounded.

Thus operational amplifier 24, connected in negative feedback by a resistor 28, provides an output signal proportional to the quantity $(3S_n - S_{n-1})$.

This quantity can be directly used to control the machining, by stopping it as soon as the quantity drops below zero.

Several modern machine tools are provided with feed motors, for instance electric stepping motors, which allow a very fine, prompt and accurate regulation of the tool feed.

Figure 3:
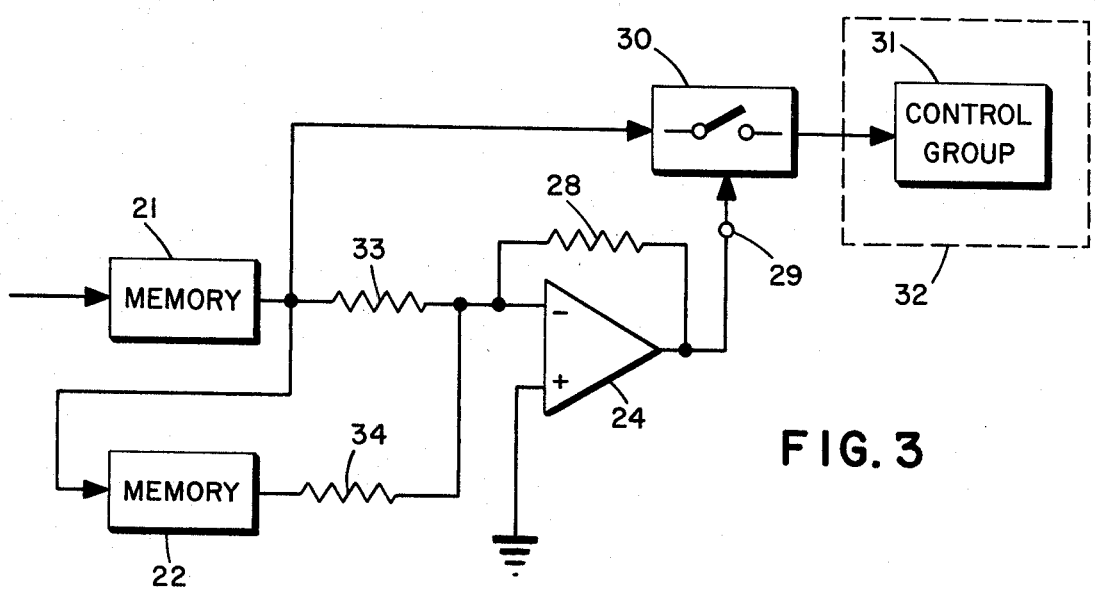
FIG. 3 shows a scheme of a second embodiment of the device according to the present invention.

The device of FIG. 2 can be modified as shown in FIG. 3 in order to be advantageously utilized in these machine tools, allowing a further reduction of the dispersion around the nominal value of the machined pieces.

The output of operational amplifier 24 is connected to a control terminal 29 of an electronic switch 30.

Electronic switch 30 is connected between the output of memory 21 and the input of the control group 31 of a per se known electrical stepping motor 32.

Stepping motor 32 acts on the tool-slide (not represented in the drawings) of the machine and effects the feed of the tool into the piece in a programmed way.

The programmed feed is modified, if necessary, by the device of the present invention, in the final phase of machining, as follows. The circuit comprising memories 21, 22, resistors 33, 34 and operational amplifier 24 is dimensioned so as to control whether:

$$S_n \leq (S_{n-1} - S_n)$$

namely:

$$S_n - S_{n-1}/2 \leq 0.$$

As soon as this inequality is verified, the output signal of amplifier 24 reaches value zero or drops below it, causing thereby electronic switch 30 to be triggered and switched on.

The signal $S_n$ is then transmitted to control group 31 which controls stepping motor 32 so as to carry out a feed movement for the subsequent cut adapted to obtain a machined workpiece having exactly the nominal size.

In practice, as it is well known, control group 31 may comprise a voltage to frequency converter supplying output pulses at a frequency proportional to the amplitude of the input voltage. The devices of FIGS. 2 and 3 can be modified to be used when the quantity of stock removed by subsequent cuts is not constant. Really, it may happen for example that said quantity changes, particularly decreases, by certain percentages or by fixed amounts. In case the device of FIG. 2 can be modified so as to stop machining as soon as double the value of the stock still to be removed is equal or lower than the evaluated depth of the next stock step the tool will remove.

In particular, supposing that the depth of the last step carried out differs from the preceding step depth by a constant quantity $$K = (S_{n-2} - S_{n-1}) - (S_{n-1} - S_n)$$

the machining is stopped as soon as:

$$S_n \leq 1/2[(S_{n-1} - S_n) - K]$$

i.e., as soon as:

$$4S_n - 3S_{n-1} + S_{n-2} \leq 0$$

Thus it is evident that the method and device of FIG. 2 remain valid also in this situation.

It is only necessary to add a further memory with relevant resistor and to suitably choose the circuit components.

Figure 4:
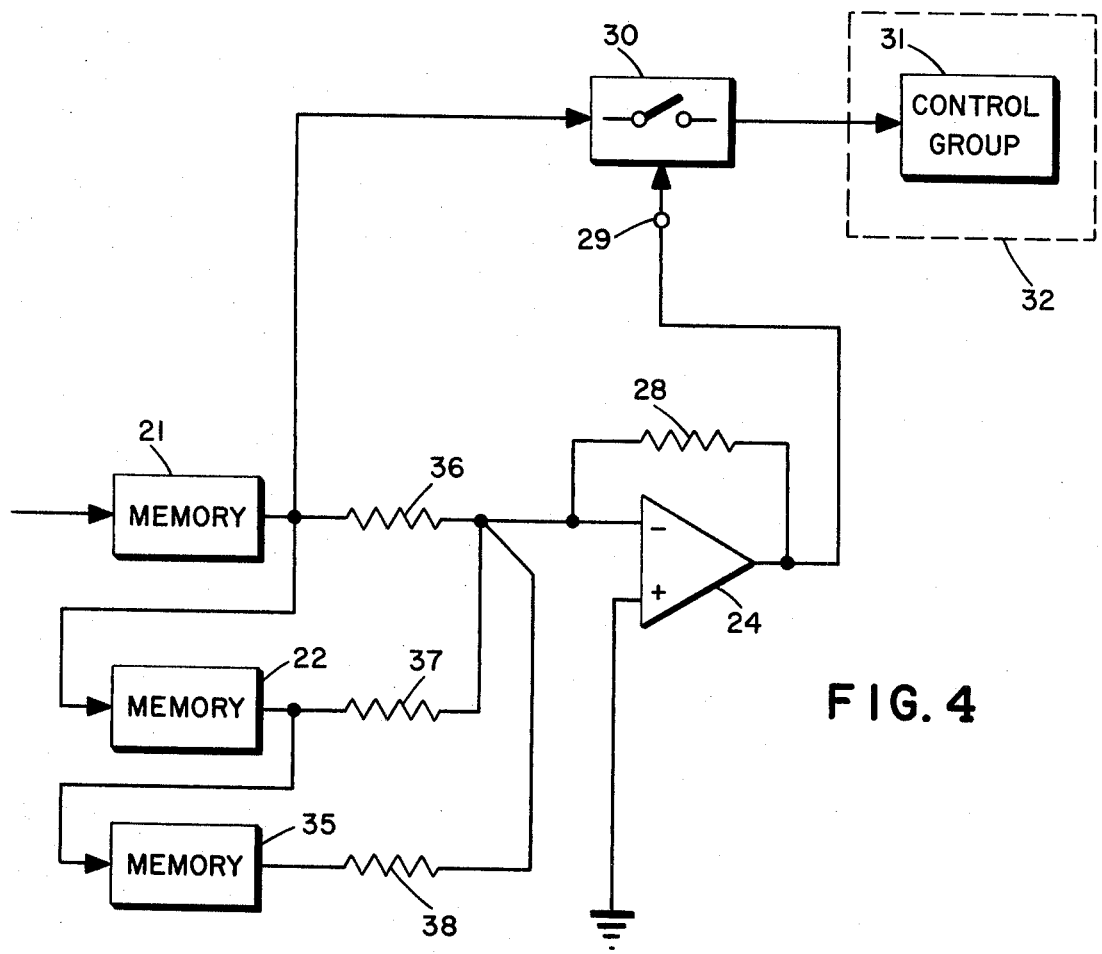
FIG. 4 shows a scheme of a third embodiment of the device according to the present invention.

The modified device now suggested can be adapted and completed as shown in FIG. 4, so as to perform functions similar to the ones of device of FIG. 3.

The device of FIG. 4 comprises memories 21, 22, 35 at the output of which there are signals corresponding to stock values $S_n$, $-S_{n-1}$, $S_{n-2}$.

The outputs of memories 21, 22, 35 are connected, through relevant resistors 36, 37, 38, with the negative input of operational amplifier 24.

The other components in FIG. 4 are equivalent to the corresponding ones in FIG. 3.

The circuit compares signals $S_n$, $S_{n-1}$, $S_{n-2}$ so as to verify whether:

$$S_n \leq [(S_{n-1} - S_n) - K]$$

namely $$3S_n - 3S_{n-1} + S_{n-2} \leq 0$$

As soon as this inequality is verified, amplifier 24 causes electronic switch 30 to be switched on, so that control group 31 receives signal $S_n$ which regulates the next cut depth of the tool in such a way as to obtain a machined piece having substantially a size corresponding to the nominal one.

What is claimed is:

1. A method for controlling machining on a machine tool carrying out subsequent cuts for removing stock from a section of a workpiece, in which the stock of the section being machined is measured after the subsequent cuts and the machine is automatically controlled on the basis of said measurements, comprising the steps of:
   storing signals representative of the stocks measured after the last and the preceding cut,
   obtaining the difference signal of said signals,
   comparing said difference signal with a signal representative of the stock still to be removed, and controlling the machine tool cycle by means of a signal resulting from said comparison.

2. The method according to claim 1, wherein said controlling step comprises stopping the machining as soon as a signal representative of double the value of the stock still to be removed is lower than said difference signal.

3. The method of claim 1, wherein said comparing step comprises obtaining a triggering signal as soon as said signal representative of the stock still to be removed is lower than a signal representing the difference between the penultimate and the last stock measured.

4. The method of claim 3, wherein said controlling step comprises controlling, by said triggering signal, feed of the tool, said feed being regulated on the basis of the signal representative of the stock still to be removed.

5. A method for the controlling of machining on a machine tool carrying out subsequent cuts for removing stock from a section of a workpiece, in which the stock of the section being machined is measured after subsequent cuts and the machine is automatically controlled on the basis of said measurements, comprising the steps of:
storing signals representative of the stocks measured after subsequent cuts,
obtaining a signal representing the depths of the quantities of stock removed by subsequent cuts,
obtaining a signal representing the depth of the stock quantity the machine would remove by the next cut, said evaluation being carried out on the basis of said stored signals and obtained depth signal,
comparing the signal representing the stock measured after the last cut with said obtained signal representing the depth of the stock quantity the machine would remove, and
controlling the machining on the basis of said comparison.

6. The method of claim 5, wherein said controlling step comprises stopping the machining as soon as a signal representative of double the value of the stock still to be removed is lower than said obtained signal representing the depth of the stock quantity the machine would remove by the next cut.

7. The method of claim 5, wherein said comparing step comprises obtaining a triggering signal as soon as said signal representing the stock still to be removed is lower than said obtained signal representing the depth of the stock quantity the machine would remove by the next cut.

8. The method of claim 7, wherein said controlling step comprises controlling, by said triggering signal, a feed of the tool regulated on the basis of the signal representative of the stock still to be removed.

9. Device for controlling the machining on a machine tool carrying out subsequent cuts for removing stock from a section of a workpiece, a measuring instrument being provided for the size gauging of the section being machined, the device comprising first memory means to sequentially store signals responsive to the values measured by the instrument at every cut, second memory means to sequentially store signals responsive to the value measured by the instrument at the preceding cut and means to compare a difference signal of said stored signals with a reference signal, the output of said comparison means being connected to means controlling the machine cycle.

10. The device of claim 9, wherein further memory means are provided to sequentially store signals responsive to other preceding values measured by the measuring instrument.

11. The device according to claim 10, wherein said first, second and further memory means are connected to a comparison circuit, said comparison circuit controlling switch means adapted to connect said first memory means with the control group of a motor for regulating the final feed of the tool.

* * * * *

UNITED STATES PATENT OFFICE
CERTIFICATE OF CORRECTION

Patent No. 3,846,689         Dated November 5, 1974

Inventor(s)   MARIO POSSATI

It is certified that error appears in the above-identified patent and that said Letters Patent are hereby corrected as shown below:

[73]    Change "Finiki" to -- Finike -- and "Bologne" to -- Bentivoglio (Bologna) --.

[30]    Change "3392/72" to -- 3392 A/72 -- and "3304/73" to -- 3304 A/73 --.

Column 2, line 40, change "$S_{n-1} - S_n/2$" to -- $\dfrac{S_{n-1} - S_n}{2}$ --.

Column 3, line 41, change "$S_n - S_{n-1}/2$" to -- $\dfrac{S_n - S_{n-1}}{2}$ --.

Signed and sealed this 11th day of March 1975.

(SEAL)
Attest:

RUTH C. MASON
Attesting Officer

C. MARSHALL DANN
Commissioner of Patents
and Trademarks